(12) United States Patent
Noda et al.

(10) Patent No.: US 7,417,808 B2
(45) Date of Patent: Aug. 26, 2008

(54) LENS UNIT

(75) Inventors: Toshinari Noda, Neyagawa (JP); Kazunari Nishihara, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 770 days.

(21) Appl. No.: 11/023,411

(22) Filed: Dec. 29, 2004

(65) Prior Publication Data

US 2005/0152050 A1 Jul. 14, 2005

(30) Foreign Application Priority Data

Jan. 14, 2004 (JP) ............................. 2004-006584

(51) Int. Cl.
*G02B 7/02* (2006.01)
(52) U.S. Cl. ...................... 359/819; 359/811
(58) Field of Classification Search ................ 359/811, 359/813, 819, 820, 825; 369/44.14–44.16, 369/44.21, 44.23, 112.24, 112.23; 348/360, 348/207.99, 781, E5.027, E5.046; 396/72, 396/144; 353/100, 101
See application file for complete search history.

(56) References Cited

U.S. PATENT DOCUMENTS

| 3,302,543 A | * | 2/1967 | Ross | ............................ 359/664 |
|---|---|---|---|---|
| 4,303,306 A | | 12/1981 | Ookawa | ....................... 359/819 |
| 4,721,361 A | | 1/1988 | Van de Ven | .................. 359/457 |
| 5,774,271 A | * | 6/1998 | Lagerway et al. | ............ 359/649 |
| 6,040,950 A | * | 3/2000 | Broome | ........................ 359/820 |
| 6,292,312 B1 | * | 9/2001 | Broome | ........................ 359/820 |
| 6,349,003 B1 | * | 2/2002 | Ko | .............................. 359/694 |
| 6,501,605 B2 | * | 12/2002 | Moriya | ........................ 359/819 |
| 2002/0126398 A1 | | 9/2002 | Moriya | ........................ 359/819 |

FOREIGN PATENT DOCUMENTS

| CN | 87100493 A | 8/1987 |
|---|---|---|
| CN | 1299981 A | 6/2001 |
| EP | 1 302 800 A1 | 4/2003 |
| JP | 4-166905 | 6/1992 |
| JP | 5-113529 | 5/1993 |

* cited by examiner

*Primary Examiner*—Loha Ben
(74) *Attorney, Agent, or Firm*—Steptoe & Johnson LLP (57) ABSTRACT

A lens unit includes a lens holder having an opening and an inner wall, the lens having an optical axis passing through the opening, a first lens having an outer circumference, and arranged in the lens holder along the optical axis, a second lens having an outer circumference, and arranged in the lens holder along the optical axis, and three strut portions provided on the inner wall of the lens holder. The strut portions position the first lens and the second lens. The strut portions have surfaces facing the optical axis, respectively, the surfaces of the strut portions slanting with respect to the optical axis and contacting the outer circumference of the first lens and the outer circumference of the second lens. This lens unit has the lenses positioned accurately.

17 Claims, 8 Drawing Sheets

Prior Art

LENS UNIT

FIELD OF THE INVENTION

The present invention relates to a lens unit used in optical instruments, such as cameras, and including plural lenses and a lens holder holding the lenses.

BACKGROUND OF THE INVENTION

Figure 7:
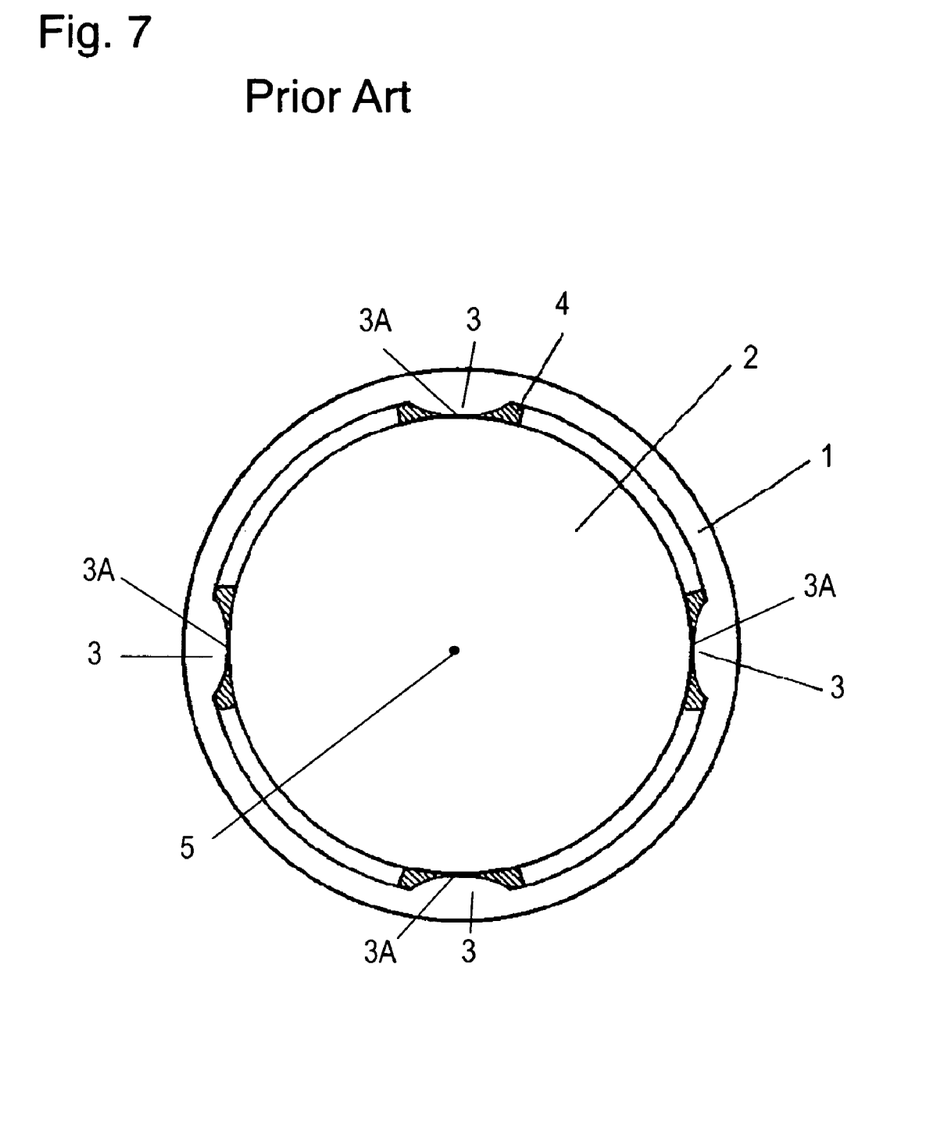
FIG. 7 is a sectional view of a conventional lens unit.

FIG. 7 shows a sectional view of a conventional lens unit disclosed in Japanese Patent Laid-Open Publication No. 04-166905. Cylindrical lens holder 1 includes projections 3 having arc sections on its inner wall. Projections 3 extend along the inner wall and are situated at places which divide the inner wall into quarters. The center of a circle inscribed on the respective tops 3A of projections 3 agrees with optical axis 5 of lens 2, and lens 2 agrees with the inscribed circle. Lens 2 is inserted into lens holder 1, and adhesive 4 has lens holder 1 rigidly hold lens 2.

This lens unit encounters with difficulty of preventing light reflection on the surface of the lens 2 or the surface of lens holder 1. Insertion of lens 2 into lens holder 1 needs clearance 6. Optical axis 5 can be adjusted at accuracy as rough as several tens of micrometers.

Figure 8A:
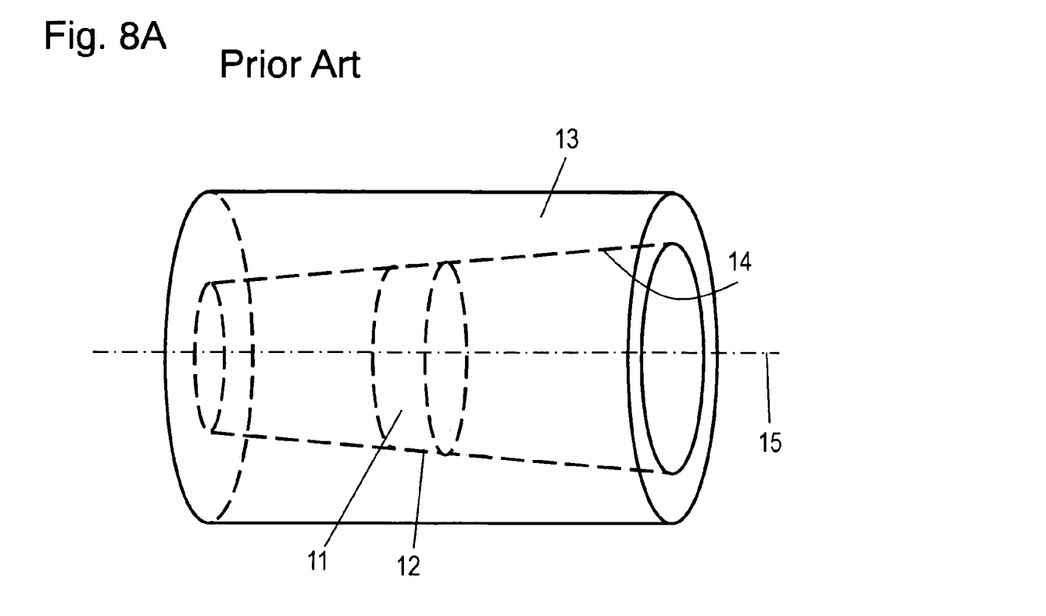
FIG. 8A is a perspective view of another conventional lens unit.
Figure 8B:
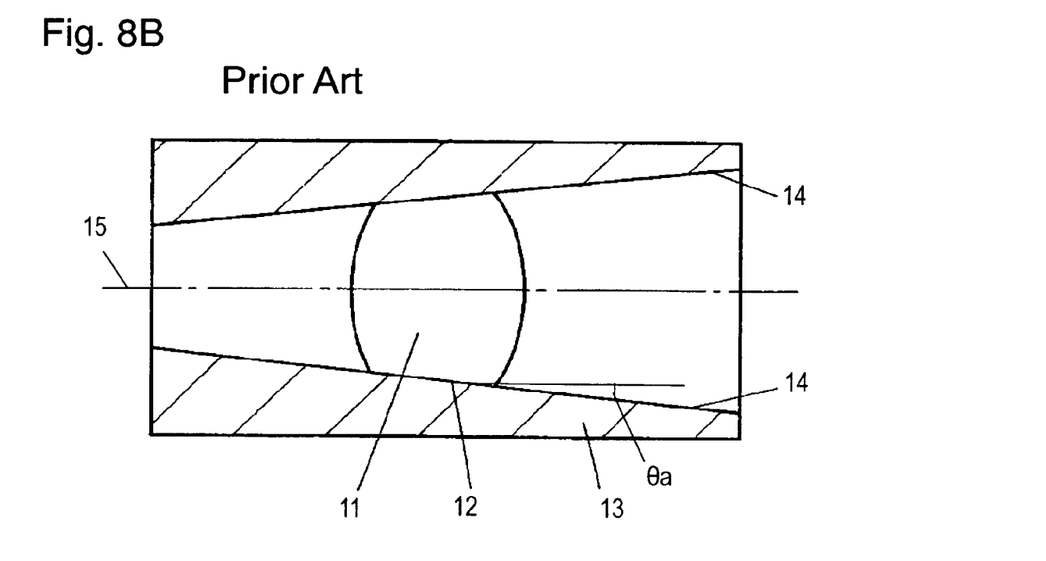
FIG. 8B is a sectional view of the lens unit shown in FIG. 8A.

FIG. 8A shows a perspective view of another conventional lens unit disclosed in Japanese Patent Laid-Open Publication No. 05-113529. FIG. 8B shows a sectional view of the lens unit shown in FIG. 8A. Outer circumference 12 of lens 11 slants by angle θa with respect to optical axis 15. Inner wall 14 of lens holder 13 also slants by angle θa with respect to optical axis 15. Outer circumference 12 fits to inner wall 14 of lens holder 13, so that lens 11 tightly and solidly contacts inner wall 14 and is held by holder 13.

This lens unit also encounters with difficulty of preventing light reflection on the surface of lens 11 and the surface of lens holder 13. Outer circumference 12 of lens 11 and inner wall 14 of holder 13 slant, hence being manufactured difficultly.

SUMMARY OF THE INVENTION

A lens unit includes a lens holder having an opening and an inner wall, the lens having an optical axis passing through the opening, a first lens having an outer circumference, and arranged in the lens holder along the optical axis, a second lens having an outer circumference, and arranged in the lens holder along the optical axis, and three strut portions provided on the inner wall of the lens holder. The strut portions position the first lens and the second lens. The strut portions have surfaces facing the optical axis, respectively, the surfaces of the strut portions slanting with respect to the optical axis and contacting the outer circumference of the first lens and the outer circumference of the second lens. This lens unit has the lenses positioned accurately.

DETAIL DESCRIPTION OF THE PREFERRED EMBODIMENTS

Exemplary Embodiment 1

Figure 1:
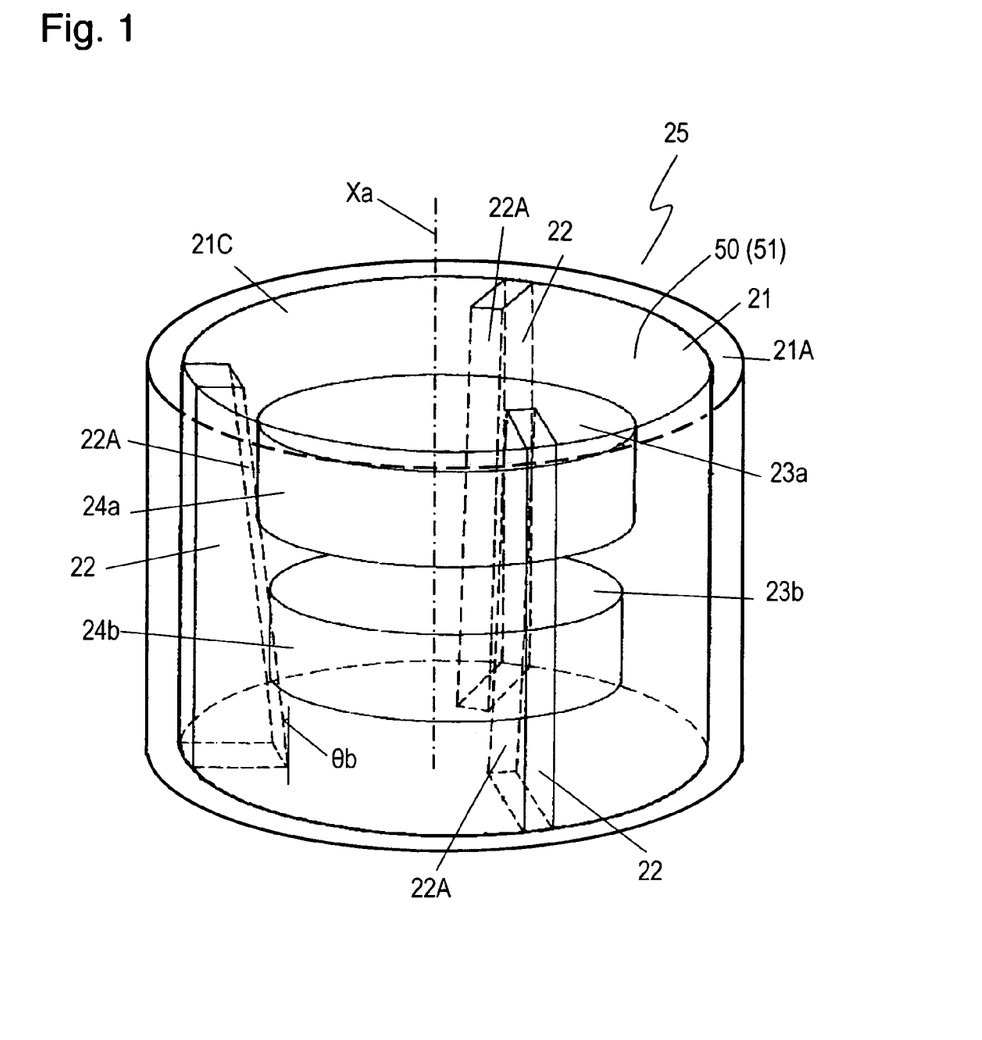
FIG. 1 is a perspective view of a lens unit in accordance with Exemplary Embodiment 1 of the present invention.

FIG. 1 shows a perspective view of lens unit 25 in accordance with Exemplary Embodiment 1 of the present invention. Lenses 23a and 23b having different outer diameters have their optical axes substantially agree with optical axis Xa. Optical axes Xa and are arranged along optical axis Xa. Optical axes Xa runs through opening 21B of lens holder 21A. Three strut portions 22 provided on inner wall 21 of holder 21A extend in parallel with optical axis Xa. Each of strut portions 22 has surface 22A facing optical axis Xa and slanting with respect to axis Xa by angle θb. Outer circumferences 24a and 24b of lenses 23a and 23b contact respective surfaces 22A of the strut portions, so that lenses 23a and 23b are positioned and fixed in holder 21A. Three strut portions 22 have the same shapes, so that a circle inscribed on surfaces 22A of three strut portions 22 is concentric with a circle formed by inner wall 21 of holder 21A.

Lens holder 21A and strut portions 22 are made of resin, such as polycarbonate, polyamide, or LCD polymer, and are preferably colored in black for preventing light reflection on inner wall 21. For instance, inexpensive polycarbonate containing 20%-30% of filler provides a small contractional anisotropy in molding, hence providing lens holder 21A with high dimensional accuracy inexpensively. Polyamide having excellent heatproof provides lens holder 21A resistive to a reflow process. Liquid crystal fluid polymer having excellent heatproof and moisture-proof provides lens holder 21a with a low profile and small deformation even in a high temperature and a high humidity. Lenses 23a and 23b may be fixed to strut portions 22 with adhesive.

Flocked sheet 50 colored in black may be provided on area 21C of inner wall 21 excluding strut portions 22. Flocked sheet 50 includes a base, such as a paper sheet, a chlorethylene sheet, or a fluoroethylene sheet, and nylon pile planted on the base. Flocked sheet 50 may include only the nylon pile without the base. Sheet 50 colored in black prevents light reflection thereon. Treatment for preventing a piece of the pile from dropping prevents the lenses from dust attached on the lenses.

Anti-reflection film 51 may be provided on area 21C of inner wall 21 of holder 21A excluding strut portions 22. Anti-reflection film 51 may be made of carbon black having a surface undergone a matting process, or polyester film colored in black in which black carbon is tempered. The film preferably has a reflectance of not higher than 0.3%. Lens unit 25 to be used in a compact camera, such as a digital camera, includes lens holder 21A having a small outer diameter of about 1 cm.

In a conventional lens unit shown in FIG. 7, if a clearance between a lens holder and a lens is as narrow as several micrometers (e.g. not greater than 30 μm) and a flocked sheet or a reflection preventive film is provided on an inner wall of the holder, the lens may not be inserted into the holder. When the clearance is wide enough for providing the flocked sheet or the reflection preventive film between the lens and the holder, an optical axis of the lens is adjustable at accuracy as rough as several tens of micrometers (e.g. not less than 10 µm).

Lenses 23a and 23b have outer diameters smaller than an inner diameter of lens holder 21A by not less than several hundreds of micrometers (e.g. 100 µm), hence preventing interference between lenses 23a and 23b and flocked sheet 50 or reflection preventive film 51.

Lens unit 25 in accordance with Embodiment 1 allows the optical axes of lenses 23a and 23b to be adjusted at accuracy of several micrometers, and prevents light reflection on inner wall 21 of lens holder 21A, hence suppressing flare and ghost.

Figure 2:
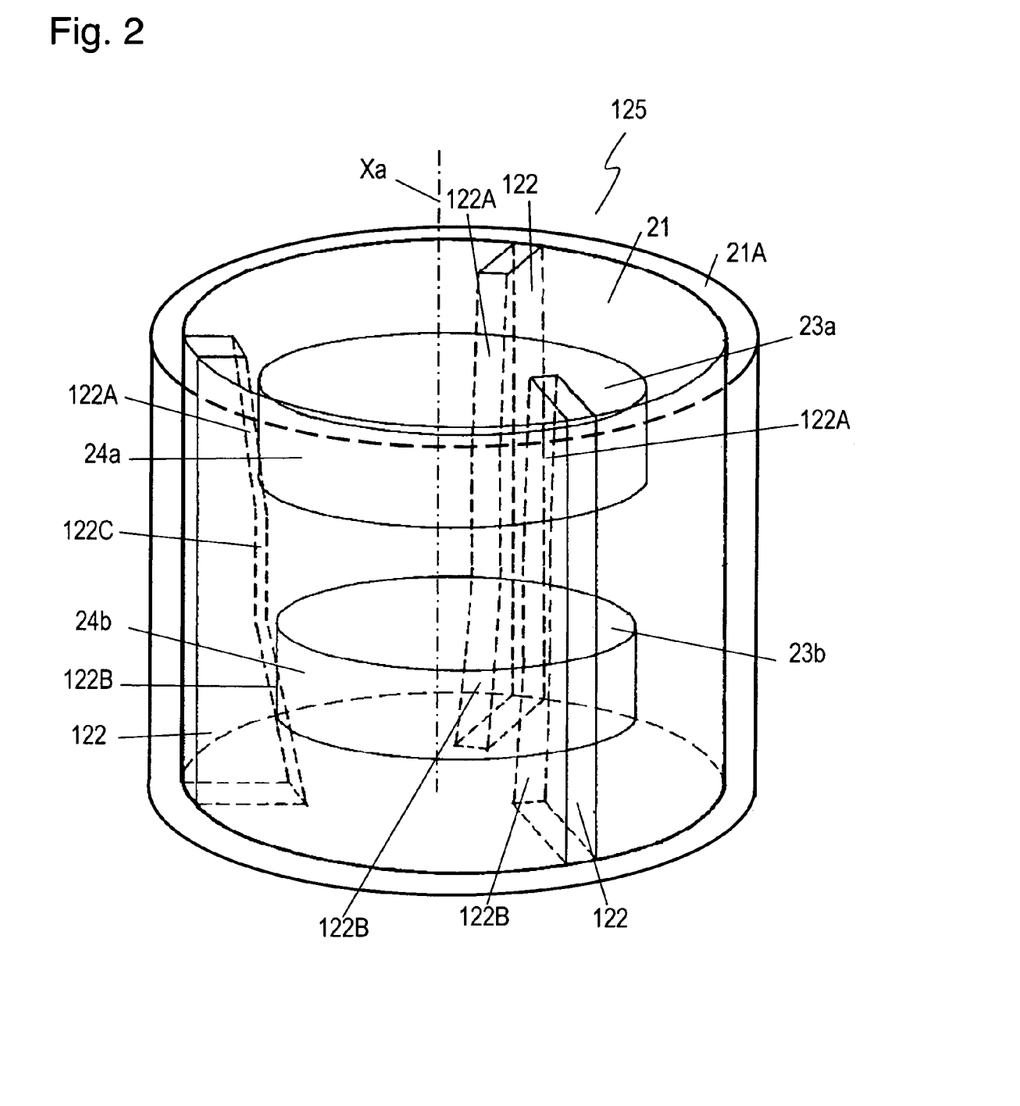
FIG. 2 is a perspective view of another lens unit in accordance with Embodiment 1.

FIG. 2 shows a perspective view of another lens unit 125 in accordance with Embodiment 1. Lens unit 125 includes three strut portions 122 instead of three strut portions 22 shown in FIG. 1. Each of strut portions 122 has surfaces 122A and 122B facing optical axis Xa. The surfaces 122A and 122B contact lenses 23a and 23b respectively, and slant with respect to optical axis Xa. A surface facing optical axis Xa, of each of strut portions 122 includes surfaces 122A and 122B, and surface 122C. Surface 122C may be in parallel with or slant with respect to optical axis Xa.

Lens units 25 and 125 fix lenses 23a and 23b having outer diameters different from each other accurately to inner wall 21 of lens holder 21A.

Figure 3:
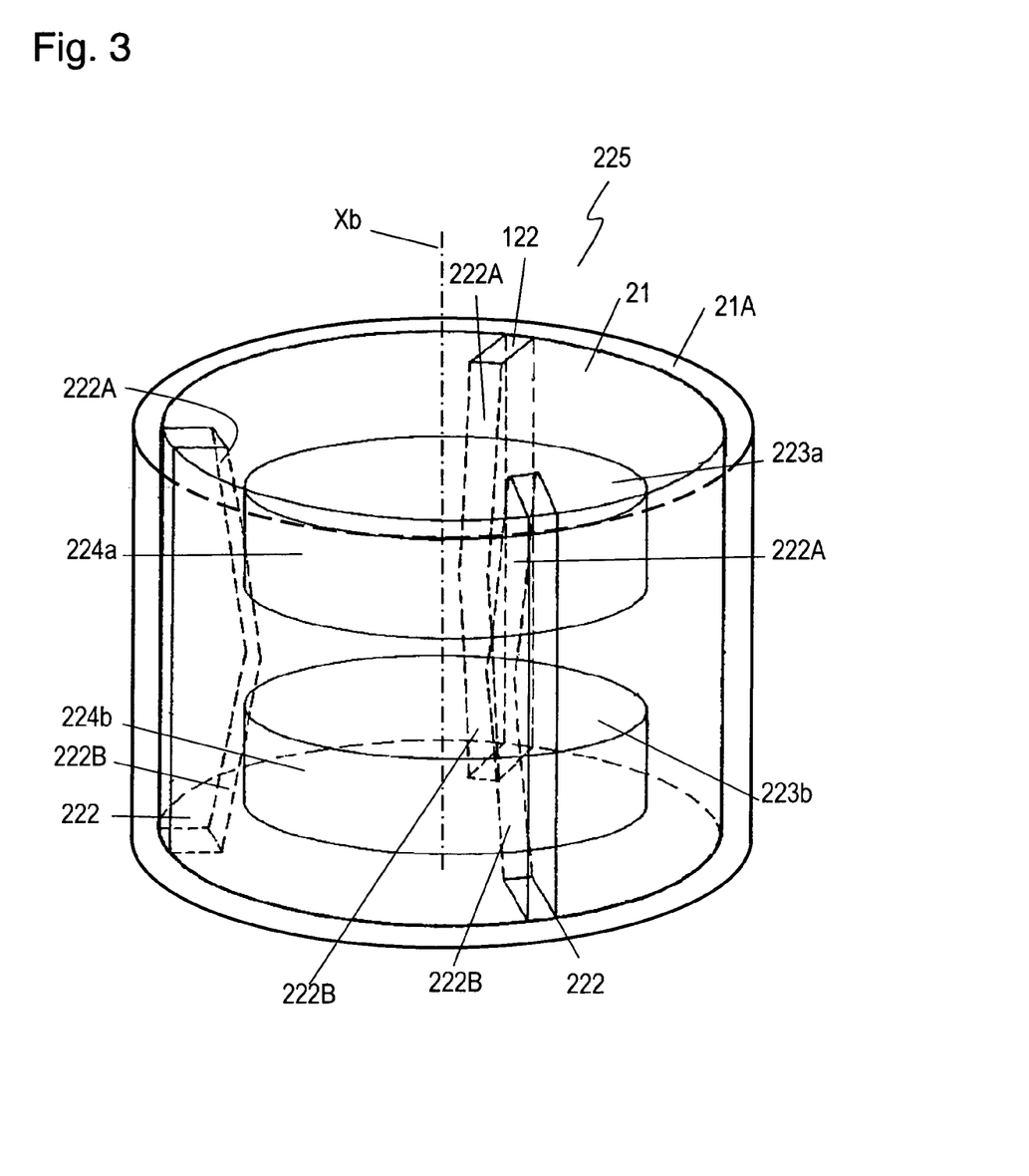
FIG. 3 is a perspective view of a further lens unit in accordance with Embodiment 1.

FIG. 3 is a perspective view of further lens unit 225 including three strut portions 222 instead of three strut portions 22 shown in FIG. 1. Lenses 223a and 223b have optical axes substantially agree with optical axis Xb, and are arranged along optical axis Xb. Surface 222A of each of strut portions 222 facing optical axis Xb contacts outer circumference 224a of lens 223a, and slants with respect to optical axis Xb. Surface 222B each of strut portions 222 facing optical axis Xb contacts outer circumference 224b of lens 223b, and slants with respect to optical axis Xb. Surface 222B slants in a direction opposite a slanting direction of surface 222A. Lenses 223a and 223b may be fixed to strut portions 222 with adhesive.

Lens unit 225 allows lenses 223a and 223b to be fixed to inner wall 21 of lens holder 21A accurately. Meanwhile, lenses 223a and 223b may have the same diameters or different diameters.

Figure 4A:
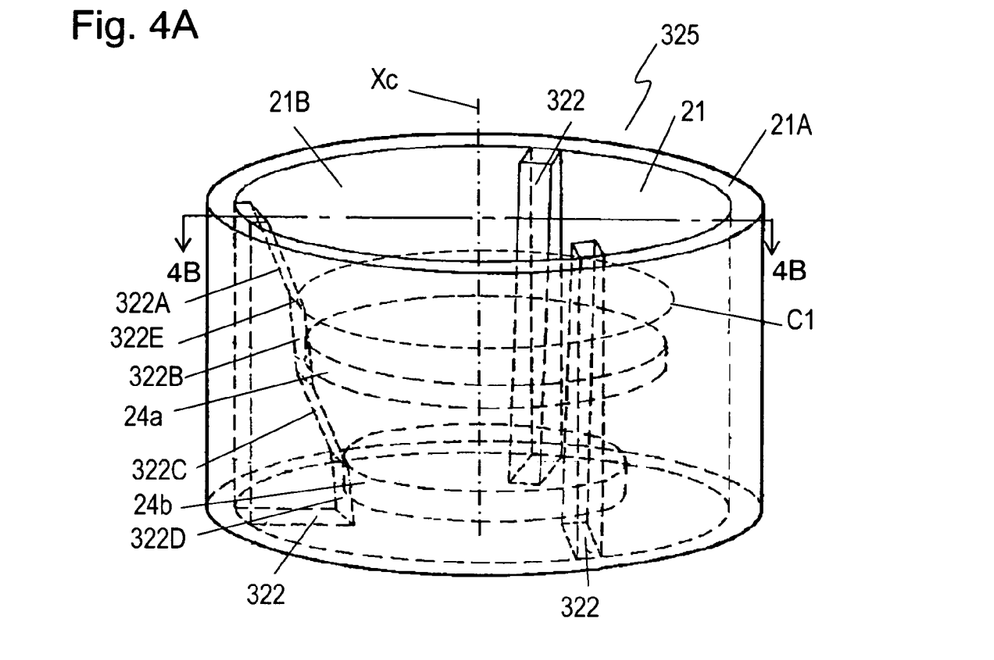
FIG. 4A is a perspective view of a still further lens unit in accordance with Embodiment 1.
Figure 4B:
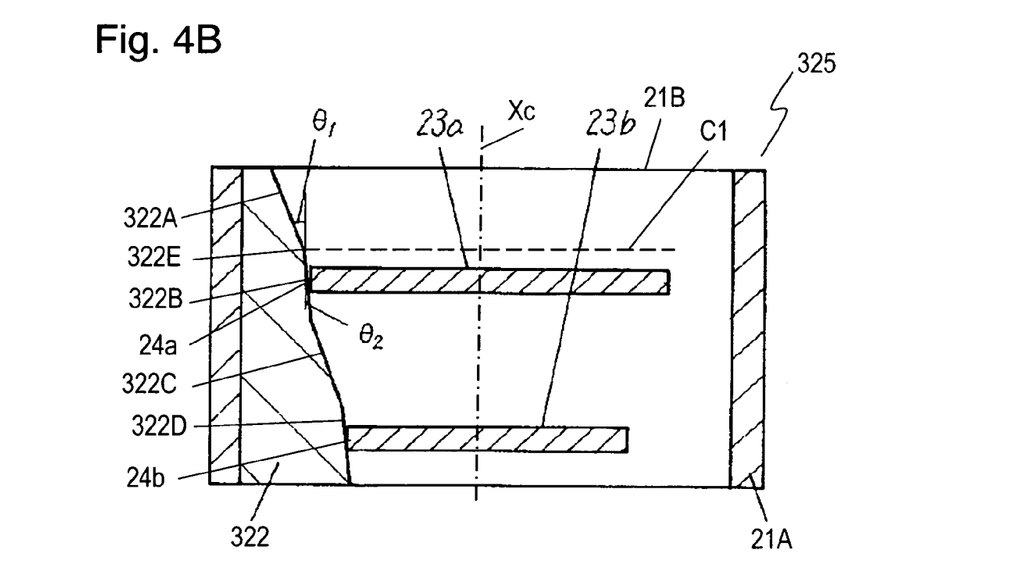
FIG. 4B is a sectional view of the lens unit shown in FIG. 4A taken along line 4B-4B.

FIG. 4A is a perspective view of still further lens unit 325 in accordance with Embodiment 1. FIG. 4B shows a sectional view of lens unit 325 shown in FIG. 4A taken along line 4B-4B. Lens unit 325 has three strut portions 322 instead of strut portions 22 shown in FIG. 1. Lenses 23a and 23b have optical axes agreeing substantially with optical axis Xc, and are arranged along optical axis Xc running through opening 21B of lens holder 21A. Lenses 23a and 23b having different outer diameters from each other are inserted through opening 21B into lens holder 21A. Each of strut portions 322 has surface 322A facing optical axis Xc. Surface 322A is connected with opening 21B and slants with respect to optical axis Xc by angle θ1. Surface 322B facing optical axis Xc contacts outer circumference 24a of lens 23a, and slants with respect to optical axis Xc by angle θ2 smaller than angle θ1. Surface 322C connected with surface 322B slants with respect to optical axis Xc. Surface 322D connected with surface 322C slants with respect to optical axis Xc by an angle smaller than a slanting angle of surface 322C. Surface 322D contacts outer circumference 24b of lens 23b, thereby rigidly holding lens 23b. Surface 322A is located closer to opening 21B of lens holder 21A than surfaces 322B-322D.

Each of surfaces 322B is connected with surface 322A at boundary 322E. Circle C1 inscribing on three boundaries 322E has a diameter larger than the diameter of lens 23a by several tens of micrometers to several hundreds of micrometers (e.g. 5 µm to 100 µm). This structure allows the optical axes of lenses 23a and 23b to be adjusted accurately. Lens 23a is inserted through the circle inscribing on boundaries 322E, hence having the optical axis adjusted accurately. A space is provided between lens holder 21A and lenses 23a and 23b held by three strut portions 322, allowing the optical axes of lenses 23a and 23b to be adjusted easily.

Surfaces of strut portions 22, 122, 222, and 322 may be roughened, suppressing light reflection thereon, and preventing flare or ghost.

Exemplary Embodiment 2

Figure 5:
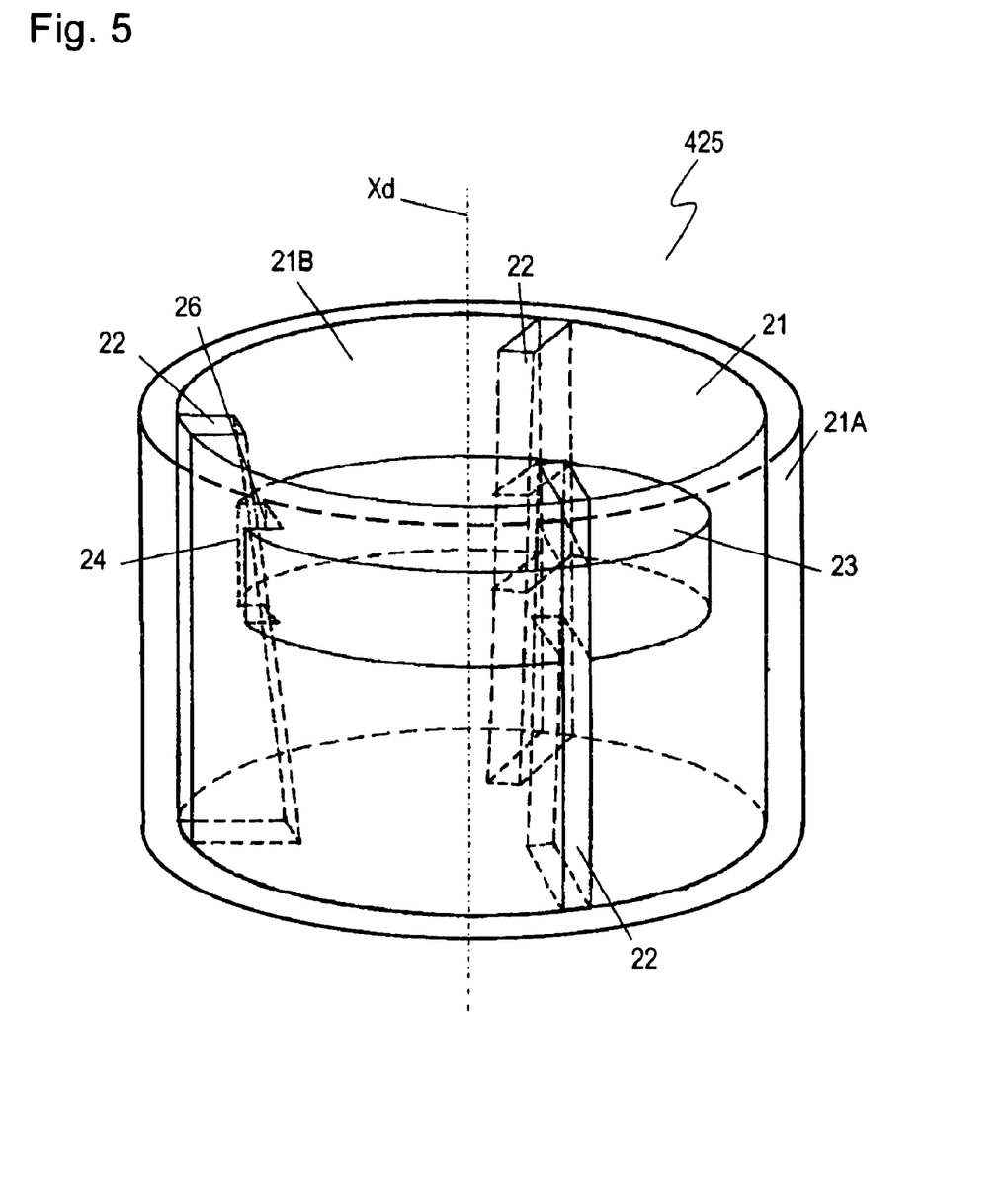
FIG. 5 is a perspective view of a lens unit in accordance with Exemplary Embodiment 2 of the invention.

FIG. 5 is a perspective view of lens unit 425 in accordance with Exemplary Embodiment 2 of the present invention. Lens unit 425 includes lens holder 21A and three strut portions 22 provided on inner wall 21 of lens holder 21A shown in FIG. 1. Lens unit 425 includes lens 23 having recess 26 formed in outer circumference 24. Recess 26 engages with one of strut portions 22. This structure prevents lens 23 from slanting with respect to optical axis Xd and falling. Recess 26 may have a surface roughened, suppressing light reflection thereon and preventing flare and ghost.

Such recess may be formed in each of lens units 125, 225 and 325 shown in FIGS. 2-4B, providing similar advantages discussed above.

Exemplary Embodiment 3

Figure 6A:
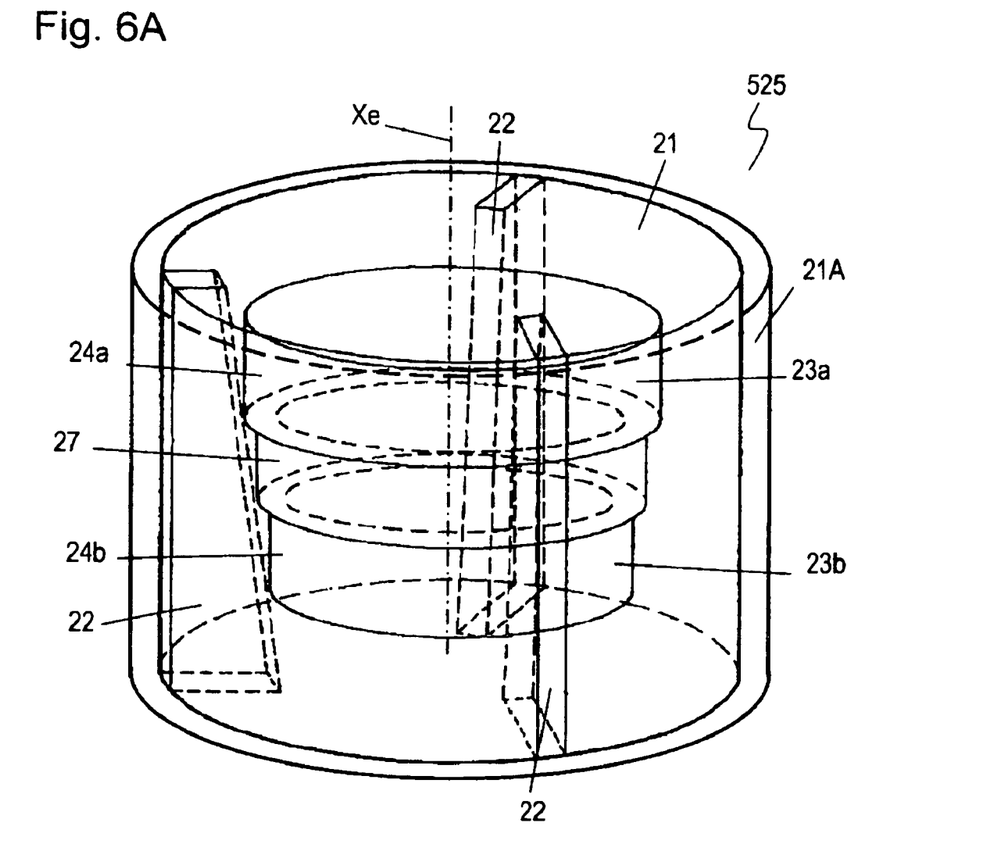
FIG. 6A is a perspective view of a lens unit in accordance with Exemplary Embodiment 3 of the invention.

FIG. 6A shows a perspective view of lens unit 525 in accordance with Exemplary Embodiment 3 of the present invention. Lens unit 525 includes lens holder 21A, three strut portions 22 provided on inner wall 21 of lens holder 21A, and lenses 23a and 23b shown in FIG. 1. Lenses 23a and 23b have respective optical axes agreeing substantially with optical axis Xe, and are arranged along optical axis Xe. Lens unit 52 includes cylindrical spacer 27 between lens 23a and lens 23b. Spacer 27 has an inner diameter preferably greater than respective effective diameters of lenses 23a and 23b. Spacer 27 may be made of variety of materials, such as metal or resin. Spacer 27 positions lenses 23a and 23b relatively and accurately, preventing the lenses from slanting.

Outer cylindrical wall 27A or inner cylindrical wall 27B of spacer 27 other than surfaces contacting lenses 23a and 23b may be roughened or colored in black, preventing light reflection thereon and suppressing flare and ghost.

Figure 6B:
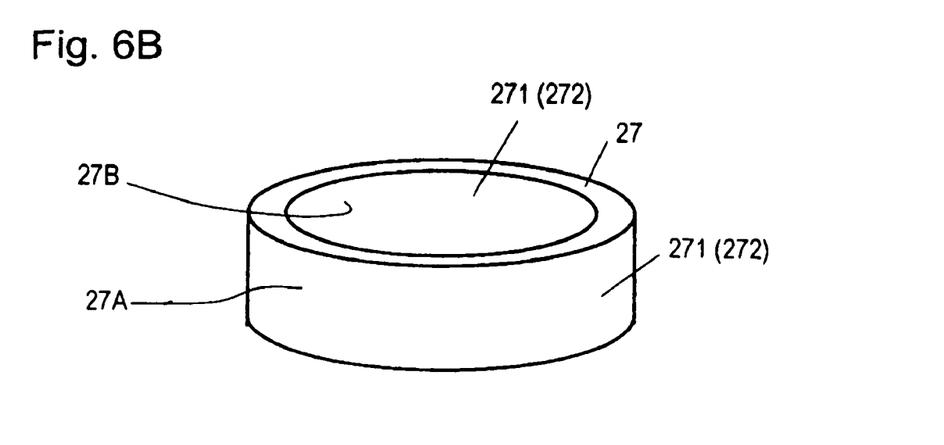
FIG. 6B is a perspective view of a spacer of the lens unit shown in FIG. 6A.

FIG. 6B is a perspective view of spacer 27 having flocked sheet 271 or light-reflection preventive film 272 provided thereon. This structure prevents light reflection thereon, and suppresses flare and ghost.

What is claimed is:

1. A lens unit comprising:
   a lens holder having an opening and an inner wall, the lens holder having an optical axis passing through the opening;
   a first lens having an outer circumference, and arranged in the lens holder along the optical axis;
   a second lens having an outer circumference, and arranged in the lens holder along the optical axis; and
   three strut portions provided on the inner wall of the lens holder, the strut portions positioning the first lens and the second lens, and having surfaces facing the optical axis, respectively, the surfaces of the strut portions slanting with respect to the optical axis and contacting the outer circumference of the first lens and the outer circumference of the second lens.

2. The lens unit of claim 1, wherein the surfaces of the strut portions have first surfaces slanting with respect to the optical axis by a first angle and second surfaces slanting with respect to the optical axis by a second angle different from the first angle, respectively.

3. The lens unit of claim 2, wherein the first surfaces are located closer to the opening of the lens holder than the second surfaces, and the first angle is greater than the second angle.

4. The lens unit of claim 3,
wherein the first surfaces are connected with the second surfaces, respectively,
wherein the strut portions have boundaries, respectively, the first surfaces are connected with the second surfaces at the boundaries, respectively,
wherein the outer circumference of the first lens contacts the first surfaces and,
wherein a circle inscribed on the boundaries has a diameter greater than an outer diameter of the first lens by a range from 5 μm to 100 μm.

5. The lens unit of claim 1, further comprising a flocked sheet provided on the inner wall of the lens holder.

6. The lens unit of claim 1, further comprising an anti-reflection film provided on the inner wall of the lens holder.

7. The lens unit of claim 1, wherein the surfaces of the three strut portions are roughened.

8. The lens unit of claim 1, wherein the inner wall of the lens holder has a cylindrical shape, and the surfaces of the three strut portions are provided concentrically with the inner wall of the lens holder.

9. The lens unit of claim 1, wherein the first lens has a recess formed in the outer circumference, and the recess engages with at least one of the three strut portions.

10. The lens unit of claim 9, the recess of the first lens has a roughened surface.

11. The lens unit of claim 1, wherein the inner wall of the lens holder has a cylindrical shape, and the first lens and the second lens have respective outer diameters smaller than an inner diameter of the lens holder.

12. The lens unit of claim 1, further comprising a cylindrical spacer provided between the first lens and the second lens.

13. The lens unit of claim 12, wherein the spacer contacts the first lens and the second lens.

14. The lens unit of claim 12, further comprising a flocked sheet provided on the spacer.

15. The lens unit of claim 12, further comprising an anti-reflection film provided on the spacer.

16. The lens unit of claim 12, wherein the spacer has a roughened surface.

17. The lens unit of claim 12, wherein the spacer has a surface colored in black.

* * * * *